Nov. 17, 1964 R. E. SCHELL 3,157,332
SYNCHRONIZED WINDOW FOR AUTOMATIC INSPECTION APPARATUS
Original Filed Oct. 31, 1958
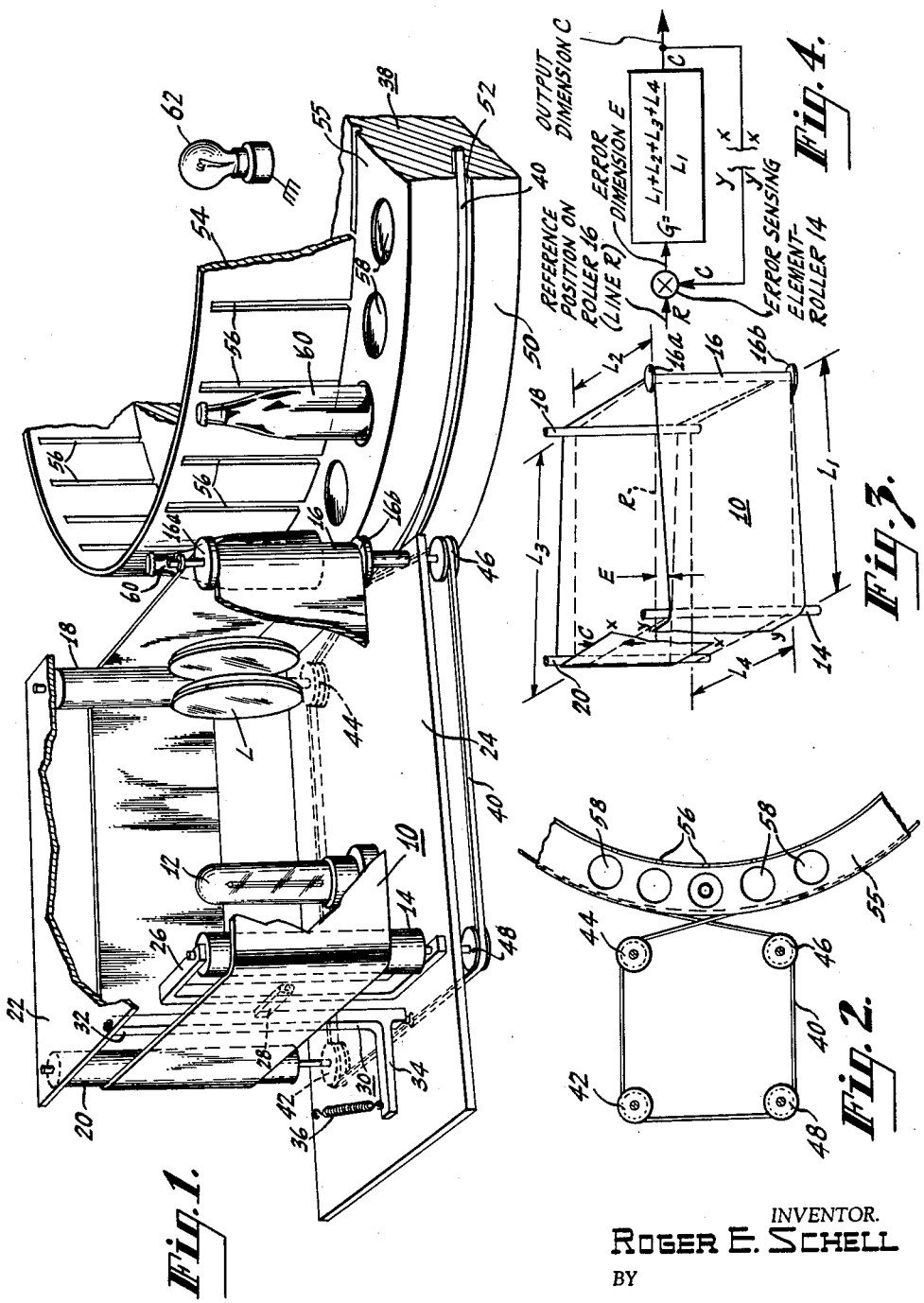
INVENTOR.
ROGER E. SCHELL
BY
Cushman, Darby & Cushman
ATTORNEYS

United States Patent Office 3,157,332
Patented Nov. 17, 1964

3,157,332
SYNCHRONIZED WINDOW FOR AUTOMATIC INSPECTION APPARATUS
Roger E. Schell, Woodbury, N.J., assignor, by mesne assignments, to Crown Cork and Seal Company, Inc., Philadelphia, Pa., a corporation of New York
Original application Oct. 31, 1958, Ser. No. 771,021, now Patent No. 3,039,354, dated June 19, 1962. Divided and this application Jan. 8, 1962, Ser. No. 173,315
3 Claims. (Cl. 226—119)

This invention relates to automatic inspection apparatus generally; and more particularly to a novel protective window, for an optical system, that is moved in synchronism with a moving light beam.

This application is a division of my copending application, Serial No. 771,021, filed October 31, 1958, now Patent No. 3,039,354, issued June 19, 1962, and is entitled to the filing date thereof.

The novel synchronized window of the present invention is particularly useful in automatic bottle inspection equipment wherein a beam of light moves at the same speed as a transparent container through which the beam of light is directed, and wherein the light emerging from the transparent container moves across the members of a stationary optical system.

It has been proposed to inspect the fluid contents of a transparent container by first causing the fluid to rotate so that any foreign particles therein will also rotate with the fluid. If a beam of light is directed through the transparent container, any modulation of the light beam by a foreign particle in the swirling fluid may be detected by an optical system including a photocell. In order to increase the speed of inspection, it has been proposed to move the beam of light at same rate of speed as the container is moved along a conveyor system. The moving container, with its swirling contents, may be analyzed for foreign particles therein by analyzing the beam of light emerging from the container over a predetermined path of inspection. The light emerging from the container, during its travel along the path of inspection, impinges on a stationary optical system and is focused onto the photocell. Changes in the intensity of the light refracted onto the photocell, as by a foreign particle moving into and out of the light beam, may be used to derive signals which may, in turn, be used to eject the container from its conveyor in accordance with any suitable means, such as described in a U.S. Patent No. 2,132,447.

During the inspection interval with the aforementioned inspection apparatus, the moving light beam sweeps across the stationary members of an optical system. If any spot of foreign material, such as a drop of water, soap, grease, dirt and the like, is deposited on these optical members, the light beam sweeping across the spot of foreign material will be modulated in the same manner as it is modulated by a swirling particle in a transparent container. The latter modulation is, of course, the desired signal, whereas the former modulation would constitute a false signal. A stationary window would protect the optical system from foreign matter, but it will not prevent the modulation of a moving light beam by foreign matter accumulated on the stationary window.

Accordingly, it is an object of the present invention to provide a novel and improved protective window for an optical system adapted for use in automatic equipment.

It is another object of the present invention to provide an improved window for an optical system and means for synchronizing the movement of the window with the movement of a light beam to be refracted by the optical system.

Another object of the present invention is to provide an improved synchronized window for an optical system in the form of an endless web of transparent material and means for guiding the web around a closed loop.

A further object of the present invention is to provide a novel and improved synchronized window and means for guiding it that are relatively simple in structure and operation, easy and economical to manufacture, and highly efficient in use.

In accordance with the present invention, the foregoing objects and related advantages are attained by means of a novel window in the form of an endless belt of transparent material and novel means for moving the window synchronously with a beam of light. The transparent endless belt is disposed around the optical system and is supported for rotation thereabout by a plurality of substantially parallel rollers. One of these rollers is a driven roller. Means are provided to drive the driven roller with an endless belt that engages with a turret in a manner whereby the turret will drive the belt. The turret is formed with means to support a plurality of transparent containers around its periphery and with means to permit a separate relatively thin beam of light to pass through each of the containers from a source of light at the center of the turret. Thus, each beam of light passing through each transparent container will sweep across a stationary optical system which, in turn, successively focuses the light emerging from each container onto a photosensitive device. By crossing the belt that engages the driven roller with the revolving turret, the window may be made to move synchronously with the beam of light because the movement of the beam of light through the transparent container is controlled by the rotating turret. Thus, the movement of the window will be synchronized with the movement of the beam through the container as it sweeps across the elements of the optical system.

Means are also provided, in accordance with the present invention, to guide the synchronized window in the form of a relatively wide plastic web around the parallelly disposed rollers. One of the rollers, other than the driven roller, is supported by the arms of a yoke. The center of the yoke is pivoted for rotation in a plane parallel to the axis of the roller. The yoke is also pivotally mounted for rotation in a plane substantially perpendicular to the axis of the roller, and means are provided to urge the roller in a direction in this latter plane to maintain the transparent web taut.

The novel features of the present invention, as well as the invention itself, both as to its organization and methods of operation, will be understood in detail when considered in connection with the accompanying drawing in which, similar reference characters represent similar parts, and in which:

FIG. 1 is a perspective drawing of the novel protective window for an optical system and the novel means for moving it synchronously with a rotatable turret, in accordance with the present invention;

FIG. 2 is a plan view of the belt drive means for driving the protective window synchronously with the rotatable turret;

FIG. 3 is a perspective view, in schematic form, of the protective window to illustrate the guidance means therefor, in accordance with the present invention; and FIG. 4 is a schematic diagram of the web guidance system in closed loop network terminology.

Referring, now, to FIG. 1, there is shown a protective window 10 in the form of an endless web of transparent material, such as the commercially available plastic material sold under the trademark "Mylar," and the like. The window 10 is disposed around an optical system comprising a set of lenses L and a photocell 12 in a manner to permit light to pass through the optical system and to keep foreign material from being deposited thereon. The window 10 is supported in a position for rotation about a vertical axis by means of four vertically disposed rollers 14, 16, 18, and 20. The rollers may be rubber coated steel shafts. The shafts of the rollers 16, 18, and 20 have their ends journaled in an upper plate 22 and a lower plate 24 for rotation therein. The roller 16 has upper and lower flanges 16a and 16b for the purpose hereinafter appearing.

The roller 14 is provided with a novel structure to keep the window 10 in a taut condition and also to guide the window 10 about these rollers. The ends of the roller 14 are supported for rotation in a vertical position by means of a U-shaped yoke 26. The yoke 26 is pivotally mounted for rotation about a pivot 28 whereby the axis of the roller 14 will revolve in a vertical plane. The pivot 28 is fixed to a vertical member 32 of an L-shaped member 30. The vertical member 32 is pivotally mounted for rotation between the upper plate 22 and the lower plate 24. The L-shaped member 30 also has a horizontal member 34 extending outwardly from the lower vertical member 32 and at right angles thereto. A spring 36 is connected between the member 34 and the lower plate 24 by any suitable means in order to bias the roller 14 in a clockwise direction. It will now be understood that the window 10 is kept taut about the rollers 14, 16, 18, and 20 because of the biasing action of the spring 36 on the L-shaped member 30.

Means are provided to rotate the window 10 about the optical system in synchronism with the rotation of a turret 38. To this end, an endless belt 40 is linked between the rotating turret 38 and the driven roller 20. The lower portion of the shaft of the roller 20 is connected to a pulley 42 in a manner whereby the belt 40 can drive the roller 20. Idler pulleys 44 and 46 may be connected to the lower portions of the shafts of the rollers 18 and 16, respectively. An idler pulley 48 may be supported by any suitable means within the lower plate 24 at a point beneath the projection of the axis of the roller 14.

The turret 38 comprises a lower peripheral portion 50 formed with an annular groove 52 for supporting the belt 40 therein. The belt 40 is engaged with the pulleys 44, 42, 48 and 46 and then crossed and engaged in the groove 52 in the peripheral portion 50 of the turret 38, as shown in FIG. 2. It will now be understood, looking at FIG. 2, that, as the turret 38 is rotated in a clockwise direction, the window 10 is rotated in a counter-clockwise direction.

The turret 38 is formed with a cylindrical wall 54 extending vertically from the peripheral portion 50. The peripheral portion 50 is formed with a ledge 55 adapted to support transparent containers, in a manner described in the United States Patent No. 2,253,581, issued on August 26, 1941, to J. H. Reynolds. The cylindrical wall 54 is formed with a plurality of slits 56 directly behind each position 58 for a transparent container 60.

A source of radiant energy, such a lamp 62, is disposed within the center of the turret 38. The turret 38 is adapted to rotate about a vertical axis by any suitable means, as, for example, the means disclosed in the last-mentioned U.S. patent. It will now be understood that, as the turret 38 rotates, a beam of light emerging from each of the slits 56 rotates with the turret and scans the lenses L of the optical system through the transparent window 10.

The operation of the window 10 and its synchronization with the movement of the turret 38 will now be described. The contents of the transparent containers 60 to be inspected have been made, to swirl, as by means disclosed in the last-mentioned patent, so that, if any foreign particles are within the fluid of the container they will rotate with the swirling fluid. As the turret 38 is rotated clockwise, for example, the crossed belt 40 will cause the window 10 to rotate counter-clockwise.

A beam of light through one of the slits 56 will pass through the transparent container 60 and scan the lenses L of the optical system through the window 10. Any foreign particles, such as dirt, soap, drops of water and the like, that have been deposited upon the window 10 will now move synchronously at substantially the same rate of speed as the beam of light. Thus, the beam of light through the container 60 may be modulated by foreign particles within the swirling fluid of the container 60, but the light beam will not be modulated by the dirt on the window 10. Since the optical system surrounded by the window 10 may also be protected from foreign matter by the upper and lower plates 22 and 24, the optical system may be kept free from foreign matter. The foreign matter upon the window 10 moves synchronously with the light beam and will not modulate the light beam to produce false signals.

The operation of the web guidance means for guiding the transparent window 10 around the rollers will now be described. Since the roller 16 carries the flanges 16a and 16b, the web 10 has no freedom of motion in its vertical position on that roller. If a lateral displacement exists on the other rollers, this displacement will be reflected in a displacement on the roller 14. Since, however, the roller 14 is free to pivot about the horizontal axis of the pivot 28, the roller 14 will rotate in a vertical plane and will assume an angular position with respect to the vertical, as shown in FIG. 3, and allow the window 10 to maintain its position between the flanges 16a and 16b on the roller 16. This angular attitude is precisely the attitude needed to guide the window 10 back to its central position.

Although a part of the window 10 is illustrated in FIG. 3 by the broken lines x—x and y—y, this is an example of an exaggerated condition with actually cannot occur. The exaggerated condition shown in FIG. 3 is used merely to illustrate the action of the web guidance system and to show that the direction of the corrective action is opposed to the direction of the displacement. This is a necessary condition for a stable system.

A description of the action of this system may be made by employing the language of closed-loop feedback network theory which is well established in the technical literature. This network theory is a natural form of expression for this system because the window 10 may be considered an actual physical loop.

FIG. 4 shows a schematic diagram of the system in closed-loop network terminology. The reference input in this case is the position R of the window 10 on the roller 16. The error sensing element is the roller 14. The error signal is the lateral displacement E shown in FIG. 3. The gain G, or amplification, of the system is expressed in the expression:

$$\frac{L_1+L_2+L_3+L_4}{L_1}$$

where the various L's are the distances between rollers, as shown in FIG. 3.

The output of the system is the dimension C, as shown in FIG. 3. This output is fed back to the input at the broken lines x—x and y—y, shown in both FIGS. 3 and 4. Under steady state conditions, the operation of the system is expressed by:

$$\frac{\text{Error}}{\text{Reference}}=\frac{E}{R}=\frac{1}{1+G}$$

Thus, there has been described a simple and inexpensize web guiding means for an endless web. Because of the thinness, inelasticity, delicacy, and high width-to-thickness ratio of the synchronized window of the present invention, the novel web guidance means shown and described herein has been found more suitable for guiding the window than conventional means.

What is claimed is:

1. In an endless web guiding system: a plurality of spaced apart rollers mounted for rotation about their respective axes and carrying an endless web, one of said rollers being mounted in a fixed position; means mounting an adjacent roller for movement relative to said one roller, said means including a rigid yoke having a pair of arms which rotatably mount said adjacent roller, a rigid support member mounted for rotation about an axis parallel to the axis of said one roller and means pivotally mounting said yoke on said support member for pivotal movement such that said adjacent roller may pivot in a plane which includes its axis; and means for urging said support member, said yoke and said adjacent roller in a direction opposite to the intended direction of movement of said web.

2. An endless web guiding system as in claim 1 wherein one of the rollers which is spaced from said adjacent roller in the intended direction of movement of the web is provided with a pair of spaced flanges to aid in guiding the web.

3. An endless web guiding system as in claim 1 wherein said support member is an elongated member mounted for rotation about its longitudinal axis and wherein said yoke is pivotally mounted on said elongated member intermediate the ends thereof.

References Cited in the file of this patent

UNITED STATES PATENTS

| | | |
|---|---|---|
| 1,374,282 | Craig | Apr. 12, 1921 |
| 2,585,424 | Balthrop | Feb. 12, 1952 |
| 2,725,787 | Jones et al. | Dec. 6, 1955 |
| 2,864,610 | Textrom | Dec. 16, 1958 |
| 2,875,668 | McKenzie | Mar. 3, 1959 |
| 2,897,721 | Cohn et al. | Aug. 4, 1959 |